(No Model.)

F. M. MOORE.
ANIMAL MUZZLE.

No. 310,842. Patented Jan. 13, 1885.

Witnesses:
W. E. Mosby.
J. W. Howell.

Inventor.
Francis Marion Moore.

UNITED STATES PATENT OFFICE.

FRANCIS MARION MOORE, OF WORCESTER, MISSOURI.

ANIMAL-MUZZLE.

SPECIFICATION forming part of Letters Patent No. 310,842, dated January 13, 1885.

Application filed June 20, 1884. (No model.)

*To all whom it may concern:*

Be it known that I, FRANCIS MARION MOORE, a citizen of the United States, residing at Worcester, in the county of Audrain and State of Missouri, have invented certain new and useful Improvements in Animal-Sucking Regulators, of which the following is a description.

My invention relates to muzzles for domestic animals—such as cows, calves, horses, &c.—and has for its object a convenient, simple device to be worn upon young calves while being weaned, or before such time during the periods when it is desired to prevent them from sucking. It is also designed for use on cows that are self-suckers, or that suck other cows, and upon horses or cattle when it is desired to turn them into a field of corn to graze in fence-corners. These objects I attain by so constructing the device that it prevents the animal from eating, except directly upon the ground.

The invention consists in certain constructions, combinations, and arrangements of parts, as will be more fully described hereinafter.

Figure 1:
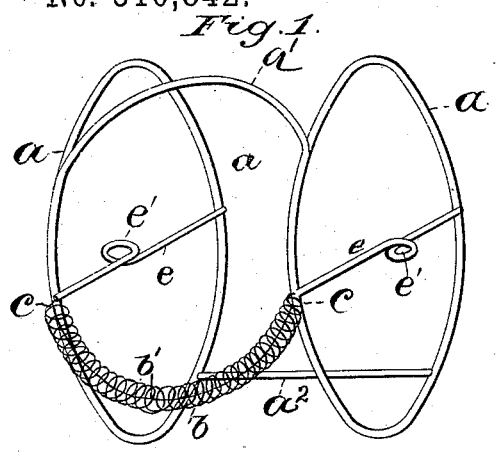
Figure 2:
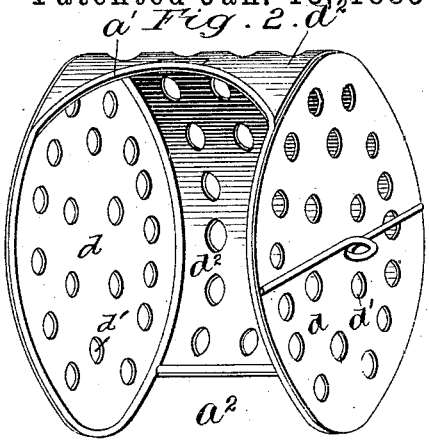
Figure 3:
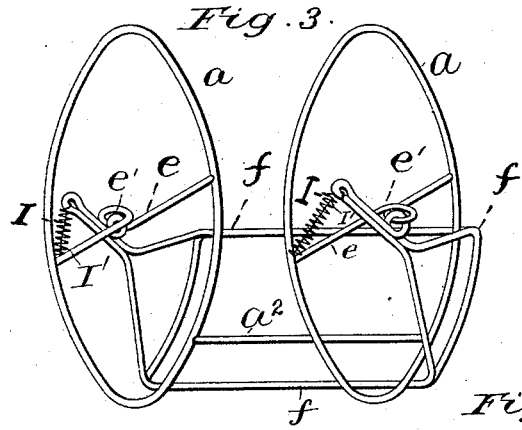
Figure 4:
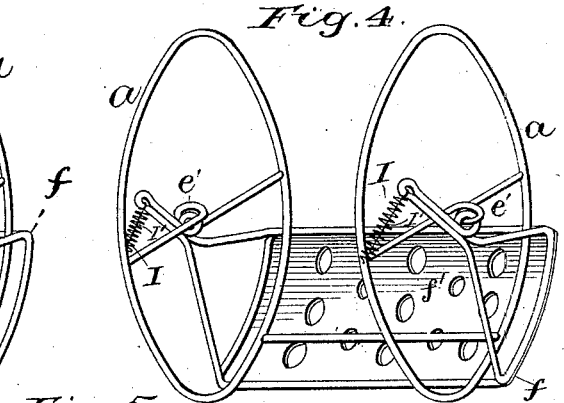
Figure 5:
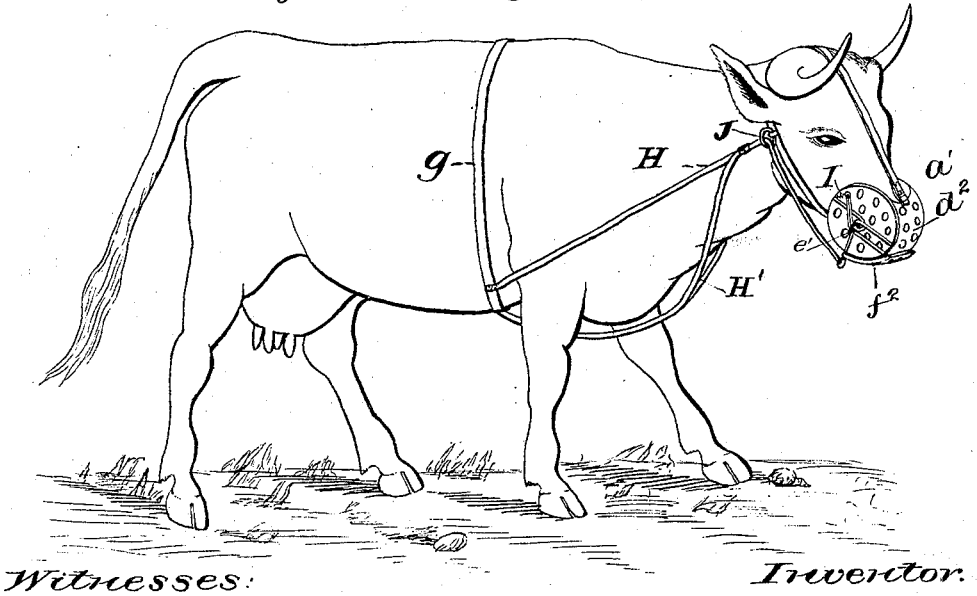

In the drawings, Figure 1 is a view of the muzzle-frame; Fig. 2, a similar view with the frame covered. Fig. 3 is a view of the muzzle-frame with the visor or slide frame attached. Fig. 4 is a similar view, except that the visor is covered. Fig. 5 is a view of a cow with the muzzle applied.

The main or muzzle frame is composed of two wire rings, $a\ a$, connected by a curved wire, $a'$, and by the spring $b$, secured at its opposite ends to each of the rings at points C C. Each ring $a$ is provided with rods $e$, looped centrally at $e'$, to provide pivots for the arms of the visor, as presently described. The rings $a$, it will be seen, are covered by plates $d$, having perforations $d'$, to provide proper ventilation. I also connect the rings by the curved plate $d^2$, also perforated, and having its edges made fast to the rings $a\ a$ for about half the circumference of said rings. The upper edge of plate, $d^2$, it will be seen, is conformed and made fast to cross-rod $a'$, which is curved, as before mentioned, for the purpose of properly fitting on the animal's nose, as seen in Fig. 5, and the lower edge of the plate $d^2$ is made fast to a rod, $a^2$. It is manifest these rods $a'\ a^2$ might be dispensed with and the edge of the plate $d^2$ be wired or otherwise properly formed to present a suitable surface for bearing against the animal. The spring $b$ is arranged a sufficient distance from the rod $a^2$ or lower edge of plate $d^2$ to permit the animal's mouth to be projected through between them. The spring $b$ has a cord or strap, $b'$, extended through it, and secured at its opposite ends to the main frame or other suitable support. This cord is made sufficiently long to permit a limited expansion of the spring and yet prevent the indefinite stretching thereof. The frame $f$ of the visor is curved to correspond with and is lapped alongside the plate $d^2$. The frame is covered by a perforated plate, $f'$, and has its arms extended alongside rings $a$, and pivoted thereto at $e'$. These arms are extended beyond their pivots, and connected by springs I with rings $a$, as shown. This holds the lower or rear edge of the visor normally close to the rod $a^2$. This leaves a sufficient space for the animal to feed in rear of said lower edge of the visor. The muzzle is secured to the animal by means of a halter of any proper form. This halter has its side straps, at points about in rear of the animal's ears, provided with rings J or other suitable guides for the straps H or H', which are secured at their forward ends to the rear edge of the visor, and at their opposite ends to a surcingle, $g$. The straps H are secured to the surcingle on the side of the animal, and the strap H' is carried between the animal's fore legs.

In operation, when the animal lowers its head or holds the same in the natural position, the visor is clear of the mouth; but if the mouth is thrown forward the strap H' tightens and draws the visor over the mouth, or, in case the strap H is used, the movement of the head far to one or the other side will tighten the strap H on the other side and draw the visor over the animal's mouth. I intend to use the straps H for self-sucking cows, and the strap H' for the other purposes before mentioned.

It will be seen from the foregoing description that the muzzle is so formed as to present no hinderance to the animal while feeding close to the ground, and no strain or annoyance while its head is in the natural position, and yet provide a device which will efficiently prevent self-sucking, &c., as before described.

I usually employ straps or cords I' in springs I similar to cords b' in springs b, and for a like purpose.

It is manifest that the covering d f', instead of being perforated plates, might be formed of wire-netting.

It is also manifest that the pivot e' might, instead of the peculiar loop form shown, be made by means of the common pin-pivot, or in other suitable manner.

Having thus described my invention, what I claim, and desire to secure by Letters Patent, is—

1. The combination, with a muzzle having a front plate and a spring extending from side to side thereof and a sufficient distance from the edge of the front plate to permit the passage of the animal's mouth, of a visor pivoted to said muzzle and movable toward the spring, and a retracting-spring, substantially as and for the purpose set forth.

2. The combination, substantially as specified, of the muzzle, the halter provided with guides, the visor pivoted to said muzzle, the retracting-springs, the surcingle, and the straps passed through said guides and secured at one end to the visor and at the opposite end to the surcingle, substantially as set forth.

FRANCIS MARION MOORE.

Witnesses:
U. S. MOSLY,
J. W. HOWELL.